Aug. 8, 1939.  E. J. VON PEIN  2,168,434
MACHINE OPERATING ON RECORD CARDS
Filed Dec. 7, 1937  9 Sheets-Sheet 1

Aug. 8, 1939.  E. J. VON PEIN  2,168,434
MACHINE OPERATING ON RECORD CARDS
Filed Dec. 7, 1937  9 Sheets-Sheet 5

INVENTOR
Edward J. Von Pein
BY
ATTORNEY

Aug. 8, 1939.  E. J. VON PEIN  2,168,434
MACHINE OPERATING ON RECORD CARDS
Filed Dec. 7, 1937  9 Sheets-Sheet 7

INVENTOR
Edward J. Von Pein
BY
ATTORNEY

Aug. 8, 1939.   E. J. VON PEIN   2,168,434
MACHINE OPERATING ON RECORD CARDS
Filed Dec. 7, 1937   9 Sheets-Sheet 8

INVENTOR
Edward J. Von Pein
BY
*[signature]*
ATTORNEY

Aug. 8, 1939.  E. J. VON PEIN  2,168,434
MACHINE OPERATING ON RECORD CARDS
Filed Dec. 7, 1937    9 Sheets-Sheet 9

INVENTOR
Edward J. Von Pein
BY
ATTORNEY

Patented Aug. 8, 1939

2,168,434

UNITED STATES PATENT OFFICE 2,168,434

MACHINE OPERATING ON RECORD CARDS

Edward J. Von Pein, Endicott, N. Y., assignor to
International Business Machines Corporation,
New York, N. Y., a corporation of New York Application December 7, 1937, Serial No. 178,486

23 Claims. (Cl. 164—112)

This case relates to the system of automatic accounting employing punched statistical record, or tabulating cards or forms.

In this system, a card is punched in parallel columns to designate indicia or data according to a selected code. In the present case, the known Hollerith code is used, each card column having index or perforation-receiving points assigned values 9 to 0 and a single perforation in an index point of a column designating the value assigned to the punched index point.

The primary unit of the system is the punching machine which perforates the cards under manual or automatic control with the desired data.

Another, and previously separate, unit of the system is a verifying machine for checking a punched form with the data for which it was intended to be punched, in order to determine whether an error has been made in the punching operation.

One of the objects of the present invention is to provide a single unit to selectively punch or verify a card.

Another object is to provide an improved punching machine including means for interpreting or printing the significance of the perforations of the card.

The latter object contemplates provision of a single punch for punching any index position in any column of a record card.

A further object is to provide improved power means for carrying through a manual selection to punch or verify a card.

Another object also is to provide improved verifying means.

Further objects of the instant invention reside in any novel feature of construction or operation or novel combination of parts present in the embodiment of the invention described and shown in the accompanying drawings whether within or without the scope of the appended claims and irrespective of other specific statements as to the scope of the invention contained herein.

Figures 1, 2, 3:
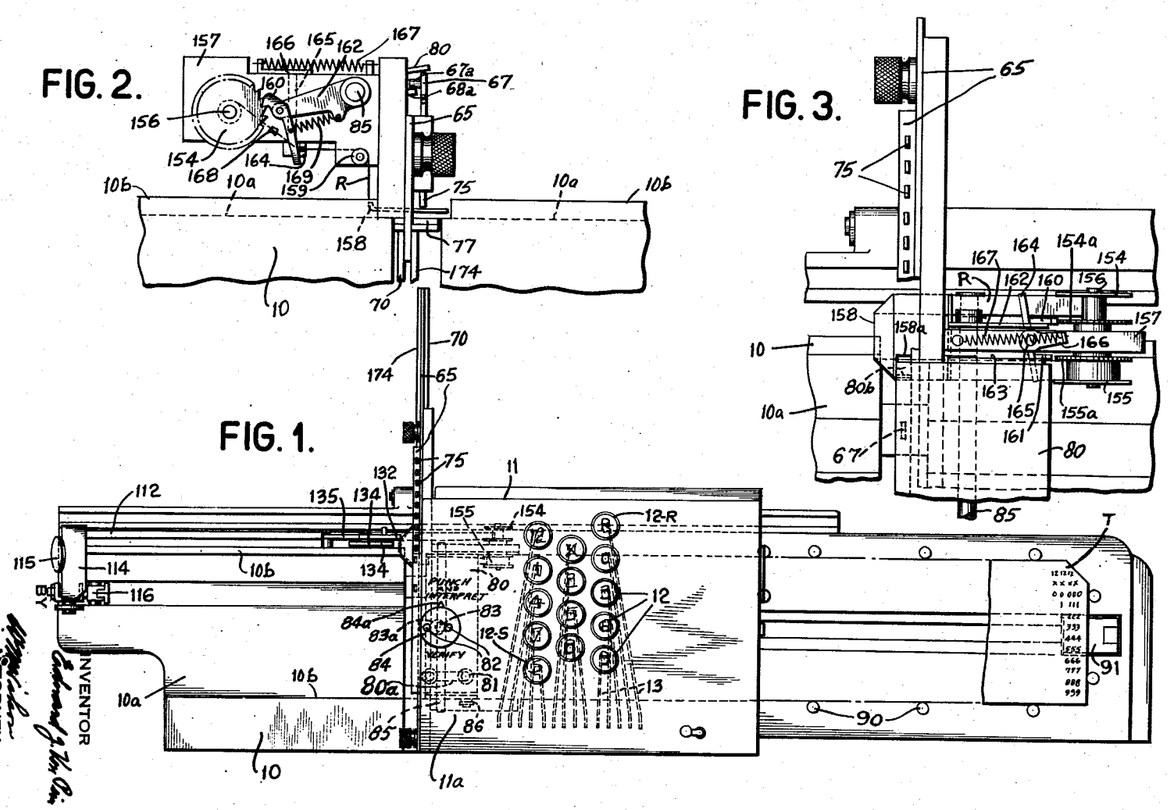
Fig. 1 is a plan view of the complete machine.
Fig. 2 is a side view of the portion of the machine containing the punching and printing means.
Fig. 3 is a plan view of the same portion of the machine.

As indicated in Fig. 1, the tabulating card T has parallel columns of index points or perforation-receiving positions. There are ten digital value positions "9" to "0" in each column. In addition, each column has "11" and "12" positions successively above the "0" positions, perforations in which are used to control machine operations, particularly in other units, such as the tabulating machine unit, of the accounting system.

The present machine has provisions for punching blank cards T in any of the "9" to "0" or "11" and "12" positions. The latter two positions are usually not interpreted; that is, a printed conventional designation of punchings in the "11" and "12" positions is not provided. Conforming to this usual practice, the present machine has means to interpret only the "9" to "0"

perforations by printing at the top of the column the conventional digital representation of the punched hole of the column. It may be noted, also, that the "11" position is customarily referred to and will be referred to hereinafter, as the "X" position.

The machine comprises a main base frame 10 having a top, flat plate 10a to support a card T. Top plate 10a carries an intermediate frame 11, mounting for vertical, slidable, movement a series of designation keys 12—0 to 9, X, 12 for initiating punching of index positions 0 to 9, X, or 12 of a card column. A space key 12—S and a release key 12—R are also provided, respectively to initiate a column space operation and a carriage release operation. Referring to Figs. 1, 6, 15, and 17, each key 12 is pivotally connected to one end of an intermediately pivoted lever 13, the opposite end of which pivotally suspends a vertical slide 14 guided for vertically slidable movement by comb bar 15 and bracket 16 fixed to the front plate 17 of the frame. The lower, rearwardly bent end 14a of slide 14 extends outside frame plate 17 and between the beveled ends of a pair of straddling stop arms 19 (also see Fig. 18). When a key 12 is depressed, acting through lever 13, it raises slide 14; against resistance of a spring 20, causing the lower end 14a of the slide to spread the straddling stop arms 19 apart, crowding the remaining stop arms together to prevent coincidental depression of any other key.

Near its lower end, the slide 14 of each designation key 12 is formed with an inclined cam edge 14b, (Figs. 15 and 17), leading inwardly and upwardly to join a notch 14c having a square upper shoulder. Hooked into notch 14c of each vertical slide 14 is the rear, bent tab 21a of a horizontal slide 21 (also see Fig. 9), guided by bracket 16 and a comb bar 22 for horizontally slidable movement, but which permit lifting of the bar. A spring 23 urges horizontal bar 21 forwardly, or to the right as viewed in Fig. 15 to maintain its rear end 21a within notch 14c of the associated vertical slide 14 when the latter is in normal position, shown in Fig. 15. The right or forward end of each horizontal bar 21 is formed with a hook 21b latched over a lug 24a of a latch lever 24 freely pivoted on a shaft 25. There is one lever 24 for each bar 21. On shaft 25 is fixed a bail 26 urged clockwise (Figs. 15 and 17) by a spring 27 and having a cross rod 28 commonly engaging all the latch levers 24 to maintain the latter against a common stop rod 29. As shown in Fig. 10, shaft 25 rigidly carries an arm 30 having a pivot stud 31 to mount a by-pass pawl 32 urged by a spring 33 to engage its tail with a pin 34 fixed to arm 30. The nose of pawl 32 is above the tail of a latch 35 held by a spring 36 in hooked engagement with the tail of a clutch dog 37 carried by a driven clutch disk 38 (also see Figs. 9 and 19) fast to a cam shaft 40. Rotatably carried by shaft 40, and adjacent clutch 38, is a driving ratchet 41 rigid with a gear 42 rotated through a helical gear 43 from a pinion 44 on a shaft 45 continually driven by a motor "M" (Fig. 10) through gearing 46.

Figure 15:
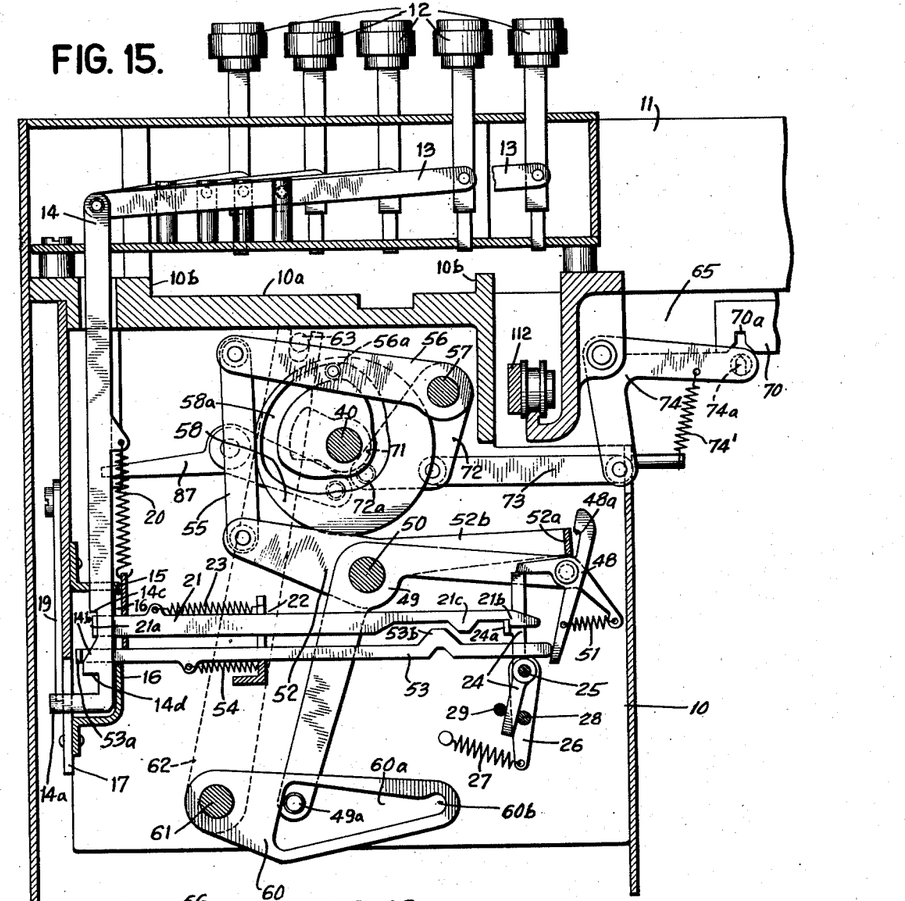
Fig. 15 is a section along lines 15—15 of Fig. 6.
Figure 17:
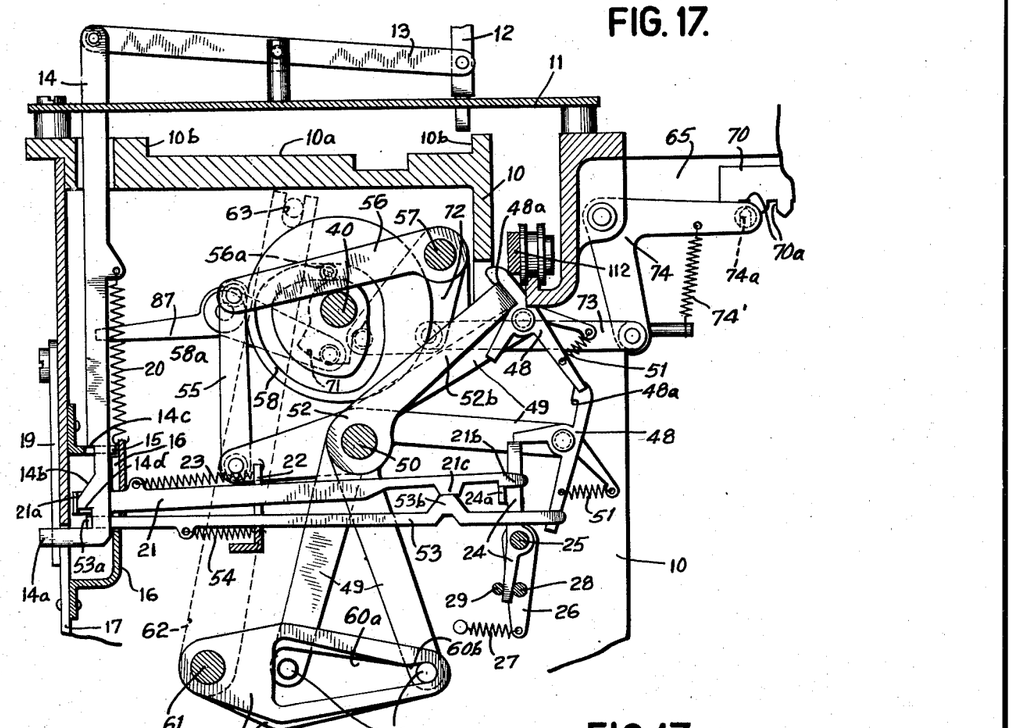
Fig. 17 is similar to Fig. 15 but showing an operated condition of the parts.
Figure 17A:
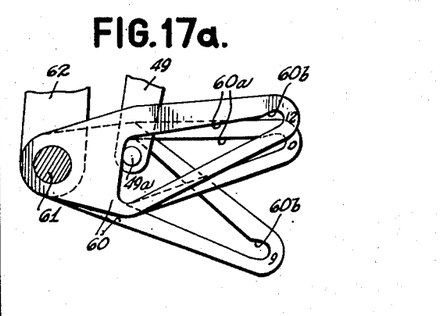
Fig. 17a is a detail view of elements which differentially determine the setting of the punching/verifying means.
Figure 18:
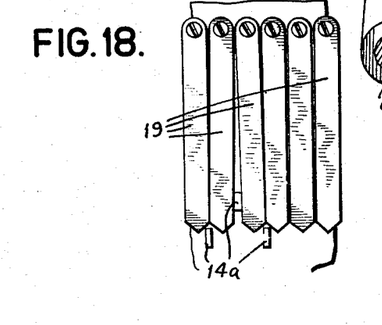
Fig. 18 is a front view of the means preventing more than one selecting key depression at a time.

Upon depression of a designation key 12, its lever 13 raises connected slide 14, causing cam edge 14b to cam against the tab 21a of horizontal slide 21, moving the latter rearwardly, as indicated in Fig. 17. Since hook 21a of bar 21 is then engaged with lug 24a of the companion latch lever 24, the rearward movement of the bar effects counterclockwise action of the latch lever. The latter, in turn, through engagement with bail rod 28, swings bail 26 and its shaft 25 counterclockwise, these actions of the latch lever and the bail and its shaft being commonly resisted by spring 27. As shaft 25 rocks counterclockwise, its arm 30 (see Fig. 10) moves down, and dog 32 on this arm strikes the tail of latch 35 to release the latter from clutch dog 37. The clutch dog, thereupon, engages the teeth of continually rotating driving ratchet 41, coupling the latter to driven disk 38 which carries the clutch dog. Accordingly, cam shaft 40, on which disk 38 is fast, is now coupled to the driving means for rotation.

The extent of downward movement of arm 30 and the dimensions and arrangement of arm 30, its dog 32, and latch 35 are such as to cause dog 32, after releasing latch 35 from clutch dog 37, to ride past the tail of latch 35. Spring 36 thereupon returns latch 35 to its normal counterclockwise position, indicated in Fig. 10, in which its head is in position to intercept the tail of clutch dog 37 when cam shaft 40 has made a single revolution. Thus, the depression of a key 12 results in only a single revolution cycle of cam shaft 40. During return, clockwise, of arm 30, which is effected subsequently to by-pass dog 32 moving down past the tail of latch 35, the by-pass dog, being permitted to rock counterclockwise relative to its carrying arm 30, ratchets past the tail of latch 35.

When latch lever 24 moved counterclockwise its upper end withdrew its support from a coupler pawl 48 (Figs. 15 and 17) pivotally carried by a bell crank 49 at the right hand end of the horizontal arm of the bell crank. There is one such bell crank 49, and pawl 48 carried thereby, for each latch lever 24, and the bell cranks 49 are rotatably carried by a common shaft 50. Pawl 48 is urged counterclockwise relative to its carrying arm by a spring 51 between the arm and the pawl. Upon release of the pawl by latch lever 24, this spring 51 rocks the pawl counterclockwise, causing a notch 48a thereof to clasp the common coupler cross bar 52a carried between sides 52b of a coupler bail 52 rotatably mounted on shaft 50 (also see Fig. 9). In this counterclockwise position of pawl 48, the free end of the horizontal arm of the pawl is at the right of its companion latch lever 24 and until the pawl moves upwardly away from the latch lever, the latter is held by the horizontal arm of the pawl against return clockwise action.

Directly underneath each hook bar 21 is a companion lock bar 53. When pawl 48 rocked counterclockwise, its lower arm, initially abutting the right end of the associated lock bar 53, as indicated in Fig. 15, withdrew from the latter, enabling a spring 54 to move the lock bar to the right, thereby seating its left, bent end 53a in a square notch 14d of the associated, raised, vertical slide 14, as indicated in Fig. 17. Accordingly, that slide 14 which has been raised by depression of a key 12 is now locked in raised, operated position, even after the operator releases the key, by coaction of bent end 53a of lock bar 53 with notch 14d of the slide. When lock bar 53 moves to the right, a cam projection 53b thereof coacts with the left side of a reverse cam projection 21c of the companion hook bar 21 to raise the latter, thus lifting hook 21b thereof clear of lug 24a of the associated latch lever 24, as indicated in Fig. 17. The latch lever, however, is still held against clockwise return movement, by engagement with the end of the horizontal arm of the associated coupler pawl 48. Thus, as a result of the depression of a key 12, a slide 14 was raised, camming a bar 21 to the rear, which by coaction with a lug 24a of a latch lever 24 rocked the latter counterclockwise. The lever arm of latch lever 24 rocked bail 26 counterclockwise, causing arm 30 of the bail shaft 25 to rock downwardly to effect coupling of the driven cam shaft 40 to the driving means for a single revolution cycle. Further, as lever 24 rocked counterclockwise, it released a pawl 48 for counterclockwise action, the horizontal arm of the latter then moving down and against the right side of the upper arm of lever 24 to temporarily restrain return in a clockwise direction of the latter, while the notch 48a of the pawl grasped the common coupler bar 52a.

Figure 8:
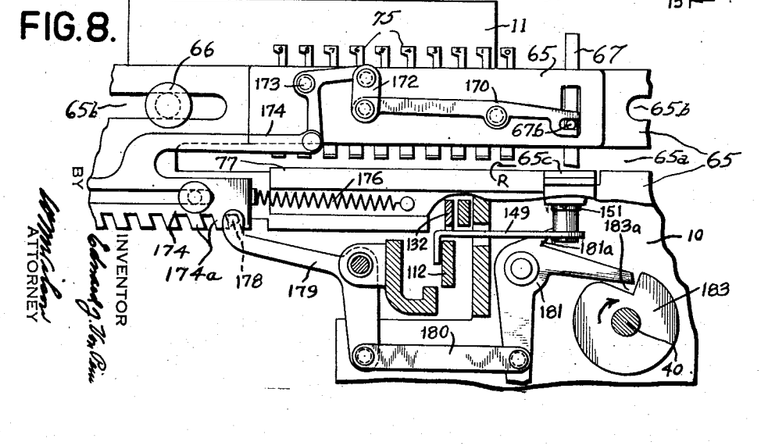
Fig. 8 is a fragmentary, transverse sectional view taken directly in front of the punching and printing bar.
Figures 9, 21:
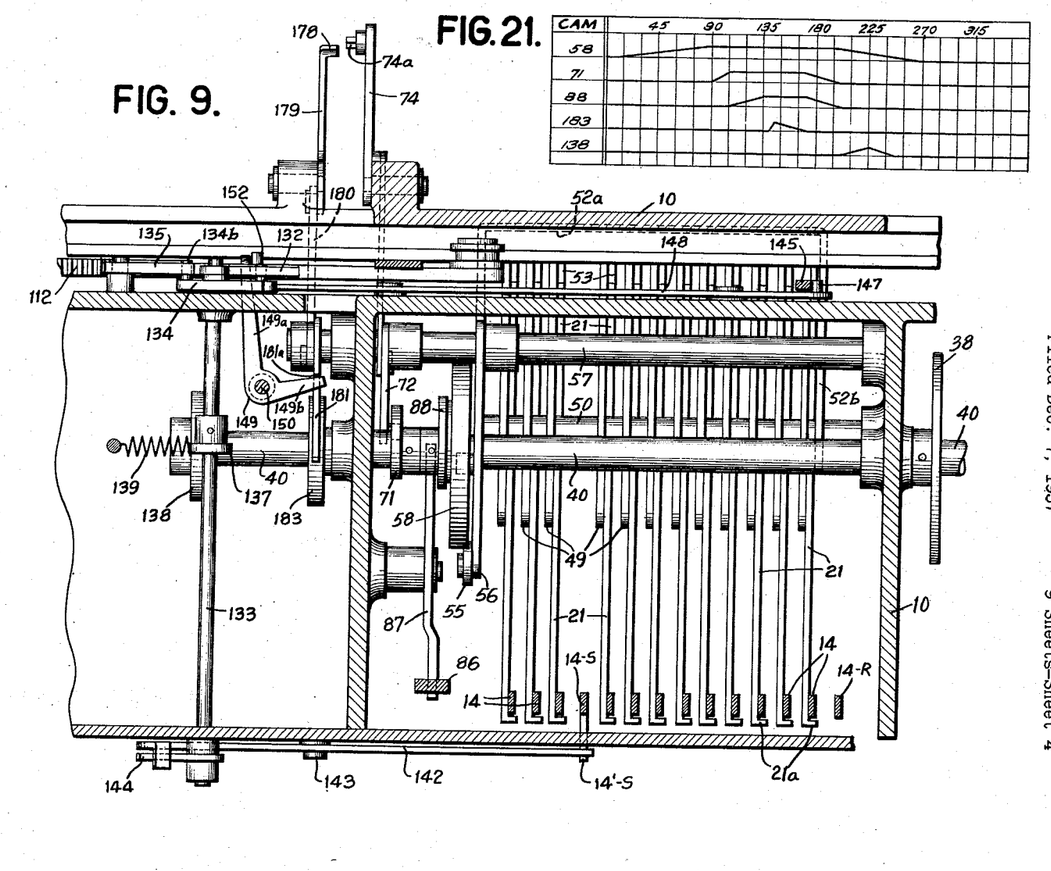
Fig. 9 is a fragmentary, plan sectional view taken below the card supporting surface of the frame.
Fig. 21 is a timing chart of the machine.
Figure 10:
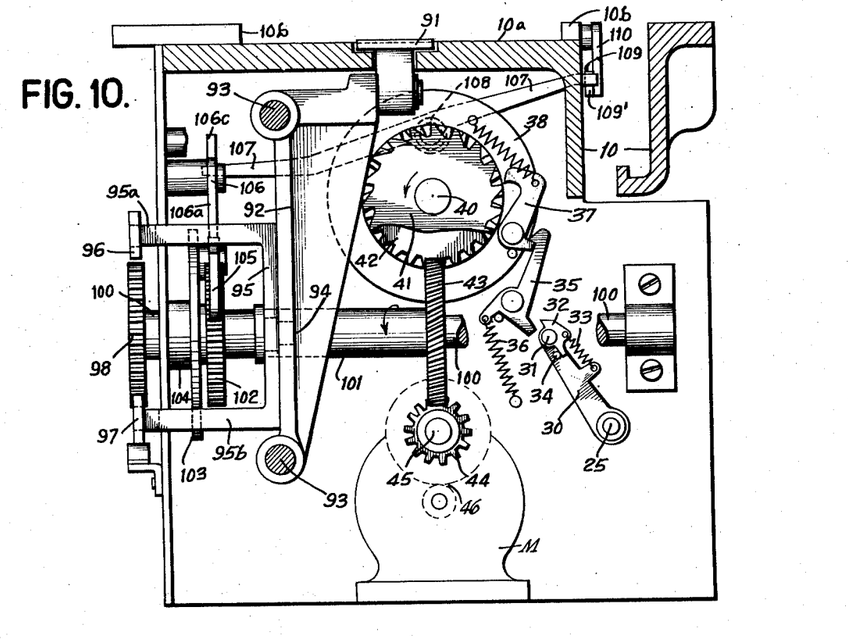
Fig. 10 is a section along lines 10—10 of Fig. 6.
Figure 16:
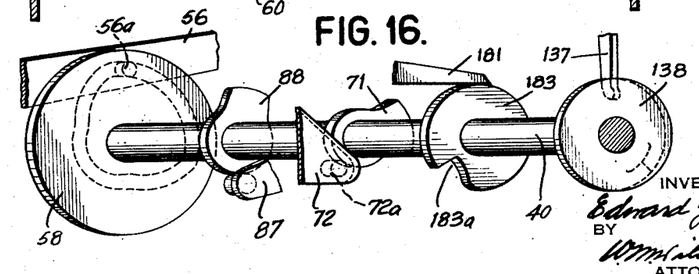
Fig. 16 is a perspective view of the cams and cam shaft used in the machine.

One of the sides 52b (Fig. 15) of coupler bail 52 has a rearward extension connected by a link 55 to an arm 56 rotatably carried by a rod 57 and provided with a roller 56a projecting into a box-cam groove 58a of a cam 58 fixed to cam shaft 40 (also see Figs. 9 and 16). As shaft 40 rotates, cam groove 58a moves arm 56 downwardly, which through link 55 rocks coupler bail 52 counterclockwise. As a result, the coupler pawl 48 which corresponds to the depressed key and is now coupled to bar 52a of coupler 52, is moved upwardly by the rising bar 52a, causing counterclockwise movement of the bell crank lever 49 carrying this particular pawl. The lower end of lever 49 has a roller 49a extending into a triangular hole 60a of a cam plate 60 fixed to a shaft 61. The upper and lower sides of the triangular hole taper towards a restricted apex slot 60b adapted to snugly receive roller 49a at the end of the counterclockwise, or forward, stroke of lever 49. There is one cam plate 60 for each lever 49, and therefore, for each designation key. The triangular holes 60a are formed with different apex angles with the apices of the different cam plates being differentially located with respect to the common shaft 61. When a lever 49 moves through its forward stroke, roller 49a thereof will cam against the upper or lower edge of the cam hole 60a of the associated cam plate 60, rocking the latter until, at the end of the forward stroke, the roller is seated in the apex. This action results in the positioning of cam plate 60 at a predetermined angle, regardless of the angular position which the cam plate may have had at the beginning of the forward stroke. Each lever 49 thereby, will set the associated cam plate 60 at a definite angle differentially related to the predetermined angular positions at which the other cam plates may be set by their respective levers 49. As a cam plate moves to its predetermined angular position, it rocks common shaft 61, to which the cam plates are fast, to a corresponding position. Fixed to the left of shaft 61 (see Figs. 4, 6, 15, and 17) is an arm 62 having a slot in its upper end receiving a pin 63 of a punch and type slide 65. As shaft 61 moves to its predetermined differential position, its arm 62 shifts slide 65 transversely of the length of the machine to a corresponding differential position (also see Figs. 1, 2, 3, and 8).

Figures 4, 5:
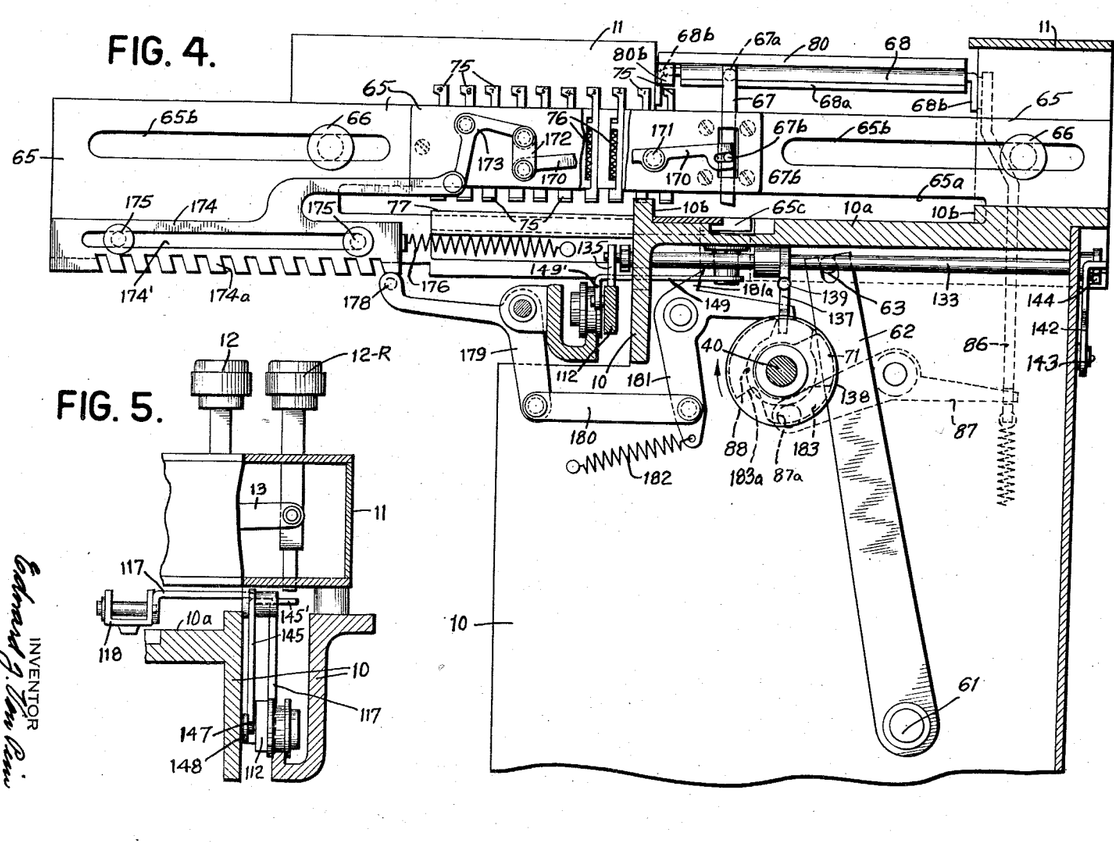
Fig. 4 is a transverse sectional view through the machine taken in front of the punching and printing means.
Fig. 5 is a transverse sectional view of a fragment of the punching machine showing the release key.

Referring particularly to Figs. 4 and 8, the punch slide 65 has a card slot 65a extending lengthwise of the slide and the lower edge of the slot is flush with the card supporting surface of top frame plate 10a. The length of card slot 65a is such that in either of the extreme differential positions of the punch slide, the ends of the slot will not engage with the sides of a card T resting on top plate 10a between the side-guiding shoulders 10b of the top plate.

The punch slide 65 is guided for horizontal sliding movement transversely of the machine by dowel screws 66 secured to key-mounting frame 11 and passing through elongated slots 65b of the punch slide. Additional guiding for the punch slide is provided by engagement of the sides of the die portion 65c of the punch slide with the opposite sides of a transverse channel 10c formed in frame 10 (particularly see Fig. 6). Die portion 65c is below card slot 65a and the top of the die portion is in the plane of card supporting top plate 10a, and bridges the channel 10c, so that a card may move smoothly from the portion of top plate 10a to the right (as viewed in Fig. 6) of the channel, across die 65a and to the portion of the plate to the left of the channel.

Die 65c has a die hole 65d (see Fig. 12) to receive a punch 67 of rectangular cross section (see Fig. 3) after the latter has passed through the card and made an elongated perforation therein. Punch 67 is vertically slidably mounted in the portion of the punch slide above card slot 65a. The upper end of the punch has a transversely extending pin 67a (see Figs. 12 and 13) resting on the forwardly protruding depressed angular lip 68a of a stripper plate 68. In the normal clockwise position of the stripper (as viewed in Fig. 13), the lip 68a maintains the punch clear above the card plane. When the punch slide is in "0" position, punch 67 and die hole 65d are at opposite sides of the "0" index position of a card column, as indicated in Figs. 1 and 4. Depression of a designation key 12, sets the previously described train of operations in effect for shifting the punch slide transversely of the machine. The extent of shifting of the punch slide depends on the cam plate 60 which is operated, and the operation of the cam plate is of such extent and in such direction as to position the punch couple 67—65c at the card index position corresponding to the depressed key.

Thus, with the punch slide at "0" position, assume the "1" key 12—1 is operated. Through its lever 13 (see Fig. 15), the key raises connected vertical slide 14, causing incline 14b of the latter to cam the coacting hook bar 21a to the left. Hook end 21b of bar 21 thereupon acts on lug 24a of latch lever 24 to rock the latter, the bail rod 28 engaged therewith, bail 26, and bail shaft 25 against resistance of spring 27. As a result, the upper end of lever 24 releases coacting coupler pawl 48 to enable spring 51 to rock the pawl counterclockwise, coupling it to coupler bar 52a. As the pawl rocks counterclockwise, its lower end permits spring 54 to move lock bar 53 to the right, bringing its left end into notch 14d of slide 14, locking the latter in raised position. Further, cam portion 53b of bar 53 acted on cam 21c of bar 21 to raise the latter, lifting hook 21b clear of lug 24a, but the latter is now retained in counterclockwise position by engagement with the horizontal arm of pawl 48. Also, when bail shaft 25 moved counterclockwise its arm 30 caused the clutching of cam shaft 40 to the driving means, as previously described. Now, as cam 58 on shaft 40 rotates, it acts on linkage 56—55 to rock coupler 52 counterclockwise, which through the interlocked bar 52a and pawl 48 similarly rocks the lever 49 on one end of which the pawl is mounted. As lever 49 rocks to the end of its forward or counterclockwise stroke, indicated in Fig. 17, the roller 49a moves into the apex slot 60b of the associated cam plate 60 and, in its course, cams against a side of the triangular hole 60a in the cam plate to rock the latter a differential amount. Shaft 61, to which all the cam plates 60 are fast, is thereby rocked the differential amount determined by coaction of one of the cam plates with the associated lever 49 which has been coupled to the coupler bail 52. The other levers 49 are in initial position and their rollers 49a are within the wide portions of their respective holes 60a, so that all the cam plates may freely rock with shaft 61 in accordance with the actuation of one cam plate by the lever 49 coupled to coupler 52. As shaft 61 is rocked to the selected differential position, its arm 62 coacts with pin 63 of punch slide 65 to move the latter one step to the right (as viewed in Fig. 4). The actuated lever 49 having rocked the associated cam plate 60 by action of roller 49a to a differential position, the roller, and consequently lever 49, may return, with no effect on the cam plate, to its initial position as the cam shaft 40 and its cam 58 complete their cycle. Thus, shaft 61 having been set in a position corresponding to the depressed key, will remain in this position until a different designation key is operated.

In above manner, depression of a "1" key 12 has moved punch slide 65 from "0" position to the "1" position for perforating the "1" index point position of a card column. The punch slide remains in this position since cam bars 60 are not restored to a home position. When the next designation key is depressed, it causes the punch slide to move from its previous key selected position to the position corresponding to the newly depressed key. Thus, depression of key 12—9 will shift slide 65 to the right to move the punch couple from its previous "1" position to the "9" index position.

Incidentally, when coupler 52 elevated coupler pawl 48 to rock its carrying lever 49 counterclockwise, the horizontal arm of the pawl withdrew from restraining engagement with the associated lever 24, which is thereupon returned clockwise by the common spring 27, acting through bail 26, its shaft 25 and bail rod 28. As shaft 25 returns clockwise, its arm 30 (see Fig. 10) moves in the same direction and by-pass dog 32 ratchets past the tail of lever 35 and back to its initial position, ready for the next cycle of operations.

When punch slide 65 is shifted to a key-selected position, its punch couple is definitely alined and located with respect to the selected index position of the card column. For this purpose, an aligning rack 70, (see Figs. 1, 2, 11, 14, 15, and 17), fastened to the punch slide, has a notch 70a (Fig. 15) for each of the twelve possible positions 9, 8, 7, 6, 5, 4, 3, 2, 1, 0, X or 11, and 12 of the punch couple. Cam shaft 40 has a cam 71 (Figs. 9, 15, 16, and 17) engaging a pin 72a on plate 72 pivotally carried by rod 57. The plate is connected by a link 73 to a bell crank 74, the right hand end of which has a tooth 74a to seat in any of notches 70a. As indicated in the timing chart Fig. 21, after cam 58 causes shifting of the slide 65 to the key-selected position, cam 71 actuates plate 72, which through link 73, rocks lever 74 to cause tooth 74a to enter a notch 70a of bar 70, thereby locking the punch slide and definitely placing the punch couple in registration with the selected index position. The punch slide is locked in the selected position during either verifying or punching and printing operations, after which tooth 74a is moved out of the notch 70a by a spring 74' to release the slide.

Figure 11:
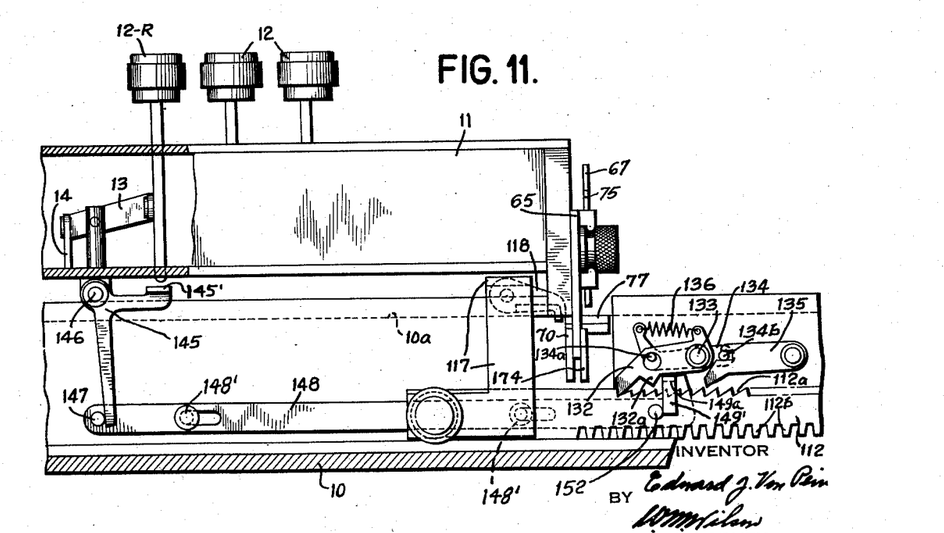
Fig. 11 is a side view, partly in section, of the rear side of the machine.
Figure 14:
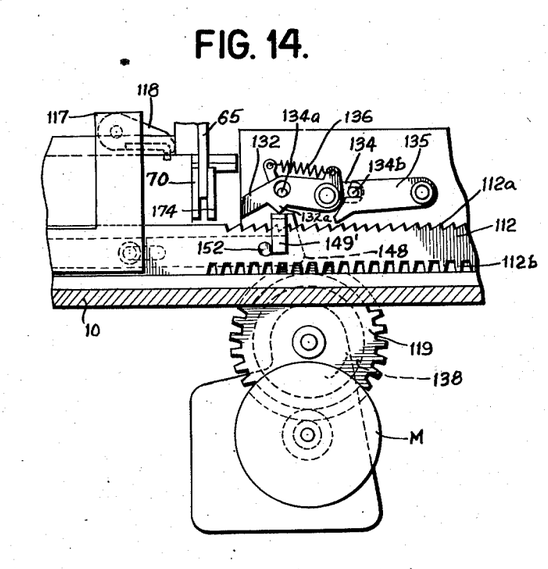
Fig. 14 is a side, sectional view showing the card feeding means.

In addition to the punch 67, the upper part of punch slide 65 also carries a column of ten type bars 75—0 to 9 (see Figs. 1, 3, 4, and 8). The type bars are normally raised above the card plane by individual springs 76 (Fig. 4). Under the column of types is a rubber platen 77 carried by the part of the punch slide below card slot 65a, and the top of which lies in the common plane of punch die plate 65c and top card-support plate 10a. Platen 77 bridges a portion of transverse channel 10c in plate 10a (as indicated in Figs. 11 and 14) to enable the card to move smoothly across the channel.

With a card column in position in card slot 65a of the punch slide, adjustment of the punch slide locates the punch couple 67—65c at the index position selected by a depressed designation key 12 and also simultaneously locates the type bar 75 corresponding to the index position at the top of the card column. Thus, when a key 12—8 is depressed, slide 65 is shifted to bring the punch couple to the "8" index position of a card column and the type 75—8 to the printing position to print character "8" at the top of the card column, the printed character interpreting the punched code designation of the column.

While the punch slide 65 is being shifted to select an index position for the punch couple, the upper pin 67a of punch 67 rides on lip 68a of stripper plate 68, while the upper end of the punch rides along the bottom of a pressure plate 80 (see Figs. 1, 2, 3, 4, 6, 12, and 13) held on stripper plate 68 by guide studs 81 fixed to the latter and extending through an elongated slot 80a of the pressure plate. This mounting permits slidable adjustment of the pressure plate on the stripper plate in a direction transverse to the length of punch slide 65 for a purpose which will be made clear hereinafter. The pressure plate 80 and stripper or restoring plate 68 may be referred to collectively as the punch operating assembly.

Figure 6:
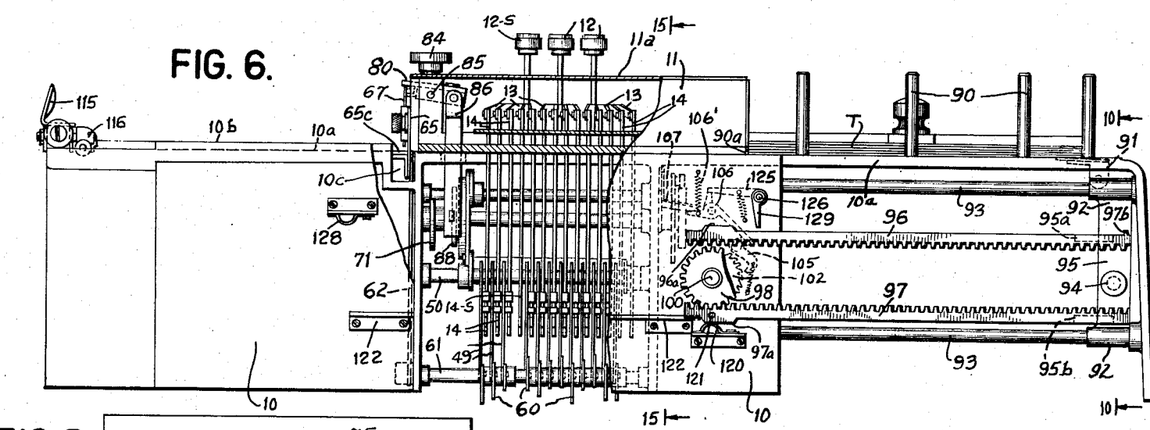
Fig. 6 is a side view, partly in section and with parts broken away, of the complete machine.

Extending upwardly from pressure plate 80 are two pins 82 (Fig. 1), between which is disposed the eccentric portion 83a of a stud 83, rotatably mounted in the cover 11a of key frame 11 and provided above the cover with a knob 84 (also see Fig. 6). Knob 84 has an index 84a for pointing either to the legend "Verify" or the legend "Punch and interpret" marked on cover 11a. By rotating knob 84 to the "Punch and interpret" position, eccentric 83a coacts with pins 82 to shift pressure plate 80 forwardly to locate the forward portion of the pressure plate in an operating position above punch pin 67, as indicated particularly in Figs. 12 and 13, and to locate a hammer portion 80b (see Fig. 4) of the pressure plate above the type 75 at printing position. By turning knob 84 to the "Verify" position, pressure plate 80 is retracted to a non-operating position, indicated in Fig. 7, in which its forward portion is removed from above the punch pin and its hammer portion 80b from above the type at printing position.

Figure 13:
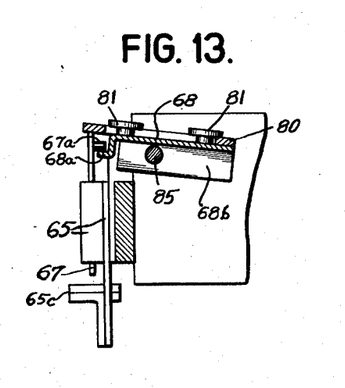
Fig. 13 is similar to Fig. 12 but shows the starting position of the punch-operating means.

Assuming knob 84 is in the "Punch and interpret" position, pressure plate 80 is in operating position. Initially, the pressure and stripper plate assembly 68—80 is in clockwise position (Figs. 6 and 13). During adjustment of punch slide 65, the top of punch 67 rides on the bottom of pressure plate 80 while the pin 67a of the punch pin rides on lip 68a of stripper plate 68. Stripper plate 68 is formed with downwardly bent opposite sides or arms 68b rockably mounted on a shaft 85. The right hand arm 68b (as viewed in Fig. 4) is pivotally connected to the upper end of a link 86 (also see Fig. 6), the lower end of which is connected to a cam follower lever 87, having a roller 87a following a cam 88 of cam shaft 40 (Figs. 4, 6, 9, and 16).

As indicated by Fig. 21 (the timing chart), after cam 58 has adjusted slide 65 to the key-selected position and after cam 71 has caused the locking of the slide by alining lever 74, then cam 88 rocks lever 87 to reciprocate link 86 for oscillating the punch-operating assembly 68—80. During the down stroke of the latter assembly, pressure plate 80 presses on the top of punch 67, depressing it to perforate the selected index point of the card column at punching position, while, at the same time, hammer portion 80b (Fig. 4) of the pressure plate strikes the head of the type 75 at printing position and effects printing thereby, at the top of the column, of the figure corresponding to the perforation. During the return stroke of the punch-operating assembly, lip 68a of the stripper plate engages pin 67a of the punch to strip the punch from the card and restore it to elevated position.

Card feed

The cards T to be punched are stacked on top of the frame plate 10a in a magazine 90 at the right (as viewed in Figs. 1 and 6) of the key frame 11. The cards lie in the magazine with their columns extending across the width of the machine and with the index points 9—0, 11, 12 disposed as shown in Fig. 1. Just behind the rear edge of the bottom card in the magazine is the feeding shoulder of a picker 91 (see Figs. 1, 6, and 10) carried by a slide 92 guided on fixed rods 93 for horizontally slidable movement below magazine 90. Pivoted on stud 94 to the side of slide 92 is a U-shaped bracket 95. The upper leg 95a of frame 95 is rigid with an upper, horizontally extending picker rack 96 and the lower leg 95b with a lower horizontal picker rack 97.

Between racks 96 and 97 is a gear 98 (also see Fig. 19) fixed to one end of a shaft 100 journaled in the frame. Gear 43, in the transmission between motor driven shaft 45 and cam shaft 40, as previously described, is rigid with one end of a sleeve 101 rotatably carried by shaft 100. To the opposite end of sleeve 101 is fixed a driving ratchet gear 102 adjacent a driven clutch disk 103 rigid with a collar 104 fast to shaft 100 (particularly see Fig. 10). Disk 103 carries a clutch dog 105 normally latched in inactive position relative to driving ratchet gear 102 by an arm 106a of a three-armed latch lever 106 urged clockwise into latching position by a spring 106'. An arm 106b of latch lever 106 is under one end of a lever 107 pivoted at 108 to the frame and having its opposite end above the reduced end 109' of a slide bar 109. In back of the reduced end 109', a bar 109 has a beveled, cam portion 109a (also see Fig. 20) which upon advance, or movement to the right (Fig. 19) of the slide bar cams the right end of lever 107 upwardly (Fig. 10). The rear or left end of slide bar 109 (Figs. 19 and 20) is pivotally connected to a lever 110 pivoted to the frame and carrying a by-pass dog 111 which is in the path of movement of the right hand end of an escapement rack 112. A spring 113 connected to lever 110 holds it in clockwise position (Fig. 19), thereby maintaining slide 109 in rear position, with its cam edge 109a in back of and its reduced end 109' under lever 107. Rack bar 112 is mounted on the frame 10, in the manner usual in similar types of punching machines (see Patent 1,772,186) for lengthwise movement and is rigidly provided with a transverse arm 114 (Fig. 1) at the left end provided with a thumb piece 115 (also see Fig. 6) and carrying an abutment 116 for the left hand or leading end of the card. A parallel arm 117 (Figs. 5, 11, 14, 19, and 20) rigid with rack 112 extends above top plate 10a and pivotally carries a card clamp and abutment 118 for engaging the rear or lagging end of the card. The rack 112, arms 114 and 117 and the card abutments 116 and 118, between which the card is to be confined, constitute a card carriage for feeding the card along top frame plate 10a and past punching slide 65.

The upper edge of rack 112 is formed with escapement ratchet teeth 112a and the lower edge of the rack with plain teeth 112b (Figs. 11 and 14). The lower teeth mesh with a gear 119 driven by a spring motor M (see Fig. 14), as is usual in this type of column-by-column card punch.

Initially, a bump 97a (Figs. 6 and 19) of lower picker rack 97 is resting on top of a leaf spring 120 thereby maintaining bracket 95 in clockwise position about pivot stud 94, with the lower rack in mesh with gear 98 and upper rack 96 out of mesh. Above bump 97a, a rack 97 is provided with a transversely extending pin 121 now being held by spring 120 with its center above the upper surface of a fixed, horizontal track 122.

Figure 19:
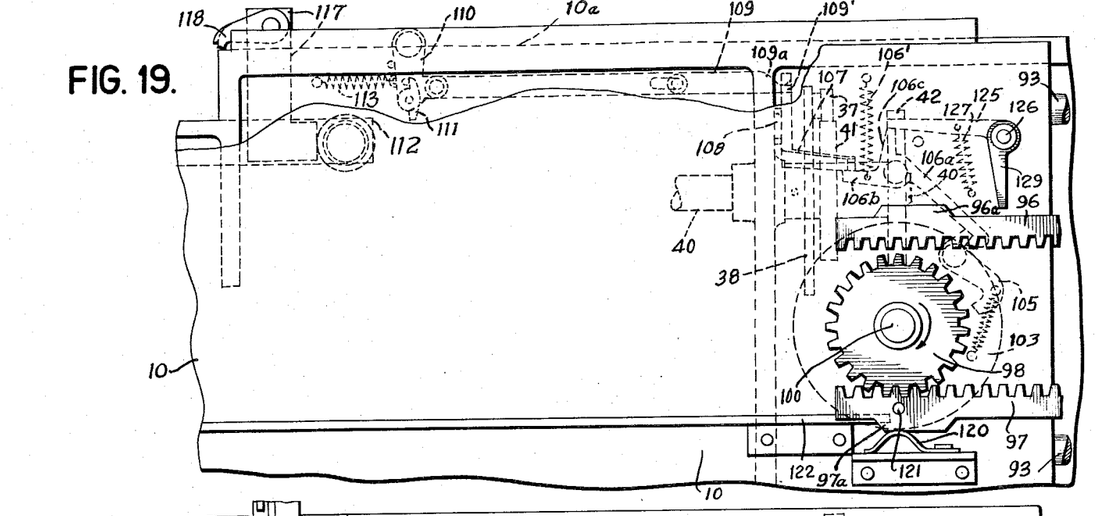
Fig. 19 is an enlarged view of a portion of the front side of Fig. 6.
Figure 20:
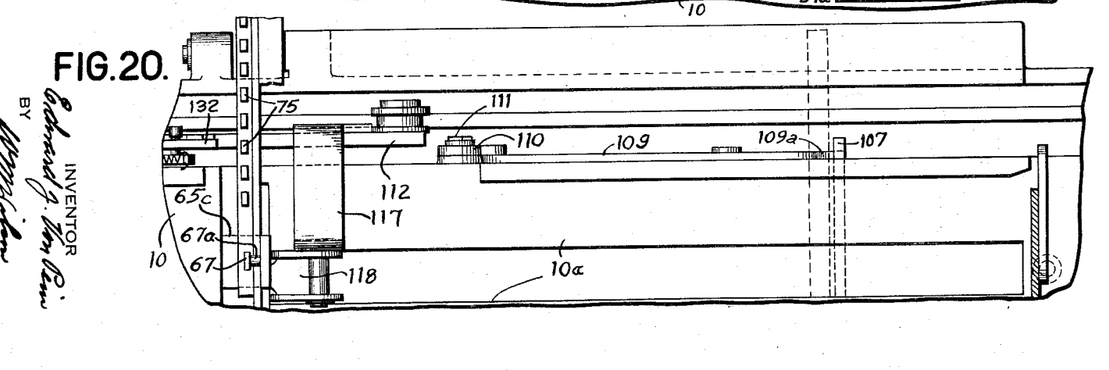
Fig. 20 is a plan view of the same portion.

At the end of the punching of the previous card, escapement rack 112 is at the extreme left (Fig. 19). To place a new card in the carriage 112—116—118, the operator now pushes on thumb piece 115 of the card carriage to manually move the carriage through its card receiving stroke, towards the right. After a short travel, in this direction, of rack 112, the right hand end of the latter engages the by-pass dog 111 of lever 110, and continued movement of the rack effects counterclockwise rocking of the latter lever, causing advance of connected slide 109 during which the cam edge 109a of the latter lifts the right end of lever 107 to cause the latter to rock counterclockwise (Fig. 10). The left, lower end of lever 107 thereupon bears down on arm 106a of latch lever 106 to rock the latter counterclockwise (Fig. 19), releasing it from clutch dog 105 which thereupon engages driving clutch gear 102, thus coupling disk 103 and its shaft 100 to driving sleeve 101 (Fig. 10). Gear 98 on shaft 100 is now being rotated, while the card carriage is continued by the operator on its card receiving stroke. When latch lever 106 was rocked counterclockwise to release clutch dog 105, the top of its vertical arm 106c moved from under an arm 125 of a shaft 126, permitting a spring 127 to rock the arm 125 downwardly to engage the right side (Fig. 19) of arm 106c for locking latch lever 106 in actuated, counterclockwise position.

Rotation of gear 98 is in a clockwise direction (Figs. 1 and 19), thereby coacting with meshed lower picker rack 97 to move frame 95 and connected picker slide 92 with its picker 91 through the forward stroke, or to the left, opposite to the direction in which the card carriage is being moved by the operator. Before bump 97a leaves spring 120, pin 121 of picker rack 97 rides onto the top of track 122, and the coaction of the pin and track continue to maintain the lower picker rack in mesh with gear 98 for the remainder of the forward stroke of the picker 91. During the forward stroke, picker 91 engages the rear edge of the bottom card T in magazine 90 and feeds this card through throat 90a (Fig. 6) and under the rear card abutment and clamp 118 of the card carriage. At the end of the card receiving stroke of the card carriage, escapement rack 112 is at the extreme right, and picker 91 has completed its forward stroke and fed the card into a position with its rear or lagging edge under rear card clamp 118, in the same manner fully disclosed in Patent 1,772,186. The card is now delivered to the carriage, and is resting on top plate 10a, with its sides between ledges 10b of the top plate, its forward or leading edge abutting front abutment 116 and its lagging edge engaged with and abutting rear clamp 118. The first card column of the card in the card carriage is then at punching position within card slot 65a of punch slide 65.

As the picker mechanism nears the end of the feed or forward stroke, a cam bump 96a of upper picker rack 96 rides under a bowed spring 128 (Fig. 6) and at the same time pin 121 of lower picker rack 97 rides off rail 122. As the picker mechanism finishes its feed stroke, the coaction of spring 128 with cam bump 96a forces the picker rack assembly to rock counterclockwise about its pivot stud 94, thereby meshing upper rack 96 with gear 98 and demeshing lower rack 97 from the gear. Further, in this position of the picker rack assembly, pin 121 of lower rack 97 is below the plane of track 122.

Just as the picker assembly completes its feed stroke, a projection 97b (Fig. 6) at the right end of upper rack 96 engages an arm 129 of shaft 126 and rocks this shaft clockwise. Arm 125 of shaft 126 thereupon rises and clears the side of arm 106c of latch lever 106, permitting the latter to be returned clockwise by spring 106'. The operations of the parts are so timed that before the latch lever fully returns to normal position, gear 98 has completed one revolution and the tail of clutch dog 105 has already passed the hook end of arm 106a of the latch lever. The latter thus fails to intercept dog 105, and the dog remains coupled to driving ratchet 102, causing gear 98 to make a second revolution at the end of which dog 105 is intercepted by latch lever 106, thereby interrupting rotation of gear 98. Thus, gear 98 makes two continuous revolutions for each new card fed to the card carriage.

At the end of the forward or feed stroke of the picker assembly, spring 128 is engaging bump 96a of upper rack 96, the latter has thereby been meshed with gear 98, and pin 121 of lower, now demeshed, rack 97 is below track bar 122. As upper rack 96 is meshed with gear 98 during the second revolution of the gear, the card picker assembly is now moved to the right, through its return stroke. Before bump 96a leaves spring 128, pin 121 of the lower rack moves under track bar 122, and coaction of the pin with the bottom of the track now continues to hold the picker rack assembly in counterclockwise position about pivot stud 94, with upper rack 96 in mesh with gear 98. The second revolution of the latter returns the picker assembly to starting position and at the end of the return stroke, pin 121 leaves track bar 122 and spring 120 again coacts with bump 97a to restore lower rack 97 into mesh with gear 98.

Column-by-column card feed

During the manually effected forward or card receiving stroke of the card carriage 112—116—118, lower spur teeth 112b of escapement rack 112 rotated gear 119 to energize spring motor M (Fig. 14). Coacting with upper, ratchet teeth 112a of rack 112 is a holding dog 132 (Figs. 1, 9, 11, and 14) normally engaging a tooth 112a to restrain actuation of the escapement rack towards the right (as viewed in Fig. 11) by spring motor M. Dog 132 is pivoted on a shaft 133 mounted between the sides of frame 10 (see Figs. 4 and 9) and to which is fast a double arm member 134 having a pin 134a on one arm extending into a hole in the holding dog and a pin 134b on the opposite arm extending into a slot in an escapement pawl 135. The nose of pawl 135 in the released position of the pawl (see Fig. 11) is above the interdental notch between a pair of consecutive teeth 112a while dog 132 is engaging the abrupt end of a tooth, being normally urged against the rack by a spring 136 between member 134 and the dog. Referring to Figs. 4 and 9, to an intermediate portion of shaft 133 is fixed an arm 137, engaged at its lower end with a face cam 138 on cam shaft 40 (also see Fig. 16). A spring 139 connected to arm 137 holds the arm against the face of cam 138. While arm 137 is riding on the flat portion of face cam 138, shaft 133 and its member 134 are in counterclockwise position (Fig. 11), and pin 134a is in lower position, permitting spring 136 to keep dog 132 in engagement with a ratchet tooth 112a of the escapement rack, with the hole in dog 132 abutting the top of pin 134a. Also pin 134b is in upper position, keeping pawl 135 out of engagement with the escapement rack.

During the cycle of cam shaft 40, after the punching and printing operation has been completed under control of cam 88 (see Fig. 21), the bump on face cam 138 rocks arm 137, its shaft 133, and member 134 thereof clockwise, raising dog 132 free of the escapement rack and causing pin 134b to lower pawl 135 into a tooth notch of escapement rack. The initial position of the rack with respect to the nose of pawl 135 is such that when the pawl is rocked downwardly, the nose moves into about the central point of an interdental notch (Fig. 14) of the rack, and as dog 132 releases the rack, spring motor M effects movement to the right of the rack (and the card carriage) for about half a tooth space until arrested by the nose of pawl 135. At this point, the nose of dog 132 is in such position that upon subsequent downward rocking of the dog, the nose will move into the tooth notch to the left of the one previously engaged by the dog. When the cam bump of cam 138 rides off arm 137, shaft 133, and member 134 thereof are returned counterclockwise by spring 139, causing pin 134b to release pawl 135 from the rack and permitting spring 136 to rock dog 132 downwardly to seat its nose in the next notch. The latter now moves substantially another half a tooth space until arrested by dog 132. The total escapement step of rack 112 is one tooth space. Each tooth space is equal to the width of a card column, so that each single escapement step causes the card carriage to move the card to the right as viewed in Fig. 11, or to the left, as viewed in Fig. 1, for one column width, thereby bringing the next card column, following the one previously punched, to operating position with respect to punch slide 65.

Thus far, punch and type selection, punching and printing, and column-by-column escapement feed of a card upon depression of a character designation key 12 have been explained.

It may be noted here that depression of the X and 12 index position keys positions the punch couple 67—65c at the X and 12 index positions of a card column. In these two latter positions, all of the types 75 are to the left of printing hammer 80b (Fig. 4), so that while the X and 12 positions of card columns are punched, no corresponding printing is effected.

The operations effected by depression of space key 12—S will now be explained.

*Space key operation.*—Depression of space key 12—S (Figs. 1 and 6) effects an escapement step or single column feed of the card without accompanying punching, printing, or other operation on the card. Depression of the space key acts through a connected lever 13 to raise vertical slide 14—S (Figs. 6 and 9). Intermediate its length, slide 14—S has a lug 14'—S on which one end of a lever 142 rests. Lever 142 is rotatably mounted on a stud 143 and the end opposite lug 14'—S is hooked over an arm 144 fastened to shaft 133 (Figs. 4 and 9). As slide 14—S rises, its lug 14'—S rocks the right hand end of lever 142 (as viewed in Fig. 9) upwardly, depressing the other, hook end to effect clockwise action of shaft 133, (as viewed in Fig. 11) against resistance of spring 139. The clockwise action of shaft 133 results in half-a-step of advance of the card carriage, as previously explained. Upon release and return of space key 14—S, the parts operated thereby reverse their directions and shaft 133 returns counterclockwise (Fig. 11), completing the escapement step. Thus, each operation of the space key effects one card column advance of the card carriage. Space key slide 14—S is not connected to any horizontal slide 21, and therefore, has no connection to punch selecting or operating means and does not initiate a cycle of cam shaft 40.

*Release key operation.*—The purpose of release key 12—R (Figs. 1, 5, and 11) is to cause a feed of the card, from whatever column position it may be in with respect to the punch slide 65, to the last column position, from which the operator may remove the card. Upon depression of release key 12—R, the lower end thereof strikes the lug 145' of the horizontal arm of a bell crank lever 145 freely pivoted on a stud 146. The other, vertical arm of lever 145 engages a pin 147 at one end of a horizontal slide 148 (also see Fig. 9). The slide is guided by studs 148' with which the slide has tight frictional engagement for frictionally maintaining the slide in its adjusted positions. The right hand end (Fig. 11) of slide 148 is turned upwardly to engage one arm 149a (also see Fig. 14) of a horizontal bell crank lever 149 pivoted on a stud 150. A spring friction washer 151 surrounding stud 150 abuts lever 149 to maintain it in any adjusted position. Arm 149a lies under escapement dog 132 and normally to the right of a V-shaped cam lug 132a thereof, as indicated in Fig. 11. Upon depression of release key 12—R, its lower end strikes lever 145, rocks the latter clockwise (Fig. 11), causing the lower end of the lever to act on pin 147 for moving slide 148 to the left, as viewed in Fig. 11, or to the right, as viewed in Fig. 9, and the upwardly formed right hand end of the slide thereupon rocks lever 149 clockwise (Fig. 9). As a result, arm 149a engages cam projection 132a to raise dog 132 until the upper edge of arm 149 is directly under the apex of the V-shaped cam projection 132a as indicated in Fig. 14. As dog 132 was lifted, while pawl 135 remained in released position, escapement rack 112 and the card carriage move to the right (Figs. 11 and 14) freely to the last column or card removing position. As this point is approached, a pin 152 on rack 112 strikes the downwardly bent end 149' of arm 149a, and returns lever 149, slide 148, and bell crank lever 145 to normal positions.

Ribbon feed

Referring to Figs. 1, 2, and 3, ink ribbon R is wound on a pair of spools 154 and 155 rotatably carried by opposite end portions of a shaft 156 mounted on the fixed bracket 157 located between the spools. At the printing position is located a fixed ribbon guide plate 158, which projects freely through card slot 65a of punch slide 65 and between the rubber platen 77 and below the normal, raised, positions of the lower ends of types 75. Plate 158 has a hole 158a (see Fig. 3) located at printing position to permit the type at printing position to freely move downwardly therethrough. The ribbon R comes off spool 154, around a guide roller 159 (Fig. 2), under plate 158, around a beveled corner of the plate, over and across the plate to the opposite beveled corner around the latter and under the plate, and around another guide roller 159 to the other ribbon spool 155. In its course from the latter corner edge of plate 158 to spool 155, the ribbon passes directly below hole 158a in the plate in position to coact with the type at printing position for effecting an imprint on the card (also see Fig. 8).

Spools 154 and 155 have their adjacent flanges in the form of ratchets 154a and 155a. Coacting with ratchets 154a and 155a are feed pawls 160 and 161 pivotally carried by arms 162 and 163 fast to shaft 85 of the punch and printing operating assembly 68—80. The tails of the feed pawls are engaged with opposite arms of a feed reversing lever 164 fast to the lower end of a shaft 165 passing through bracket 157. The upper end of shaft 165 carries an arm 166 at right angles to the lever 164 and connected to a spring 167 which holds the shaft 165 and its arms in either of opposite angular position to which it may be shifted. Opposite arms of lever 164 are slotted to form passageways for the ribbon. When a rivet 168 carried by each end of the ribbon reaches a passageway in lever 164, it cannot pass therethrough and turns the lever from one angular position to its other angular position. In the angular position of lever 164 shown in Figs. 2 and 3, the arm thereof abutting the tail of feed pawl 160 is in retracted position, permitting a spring 169 to engage the nose of the pawl with ratchet 154a of spool 154, while at the same time, the other arm of the lever is holding pawl 161 released from teeth 155a. When the angular position of lever 164 is reversed, pawl 160 is disengaged while pawl 161 is engaged, thereby reversing the ribbon feed. Upon each operation of shaft 85 of the punch operating assembly 68—80, arms 162 and 163 rock downwardly, causing the feed pawl then engaged with the ratchet flange of its associated ribbon spool to feed the latter.

Verifying operation

The punching and printing operations have been explained. The machine may be operated alternatively, for verifying a card. By verifying a card is meant the testing of the accuracy of punchings in a previously punched card. During the punching operation and printing, the operator reads the data from a record sheet or other source and depresses the keys 12 corresponding to the data and performs the other indicated operations such as space or release, to perforate the card with coded designations corresponding to the data and to cause the printing means to print an interpretation of the punching on the card itself, in the manner explained before. During verifying operation, the operator again reads the same data on the record sheet or a reproduction thereof and repeats the operations of keys 12 as in the punching and printing of this data. If the columns of the card have been correctly punched, the verifying operation will feed the card to the eject or last column position column-by-column. If any column of the card has been incorrectly punched, the verifying operation will, upon acting on this column, immediately and continuously eject the card to eject or last column position, and the operator will remove this card and segregate it from the correctly punched and verified cards.

Figure 7:
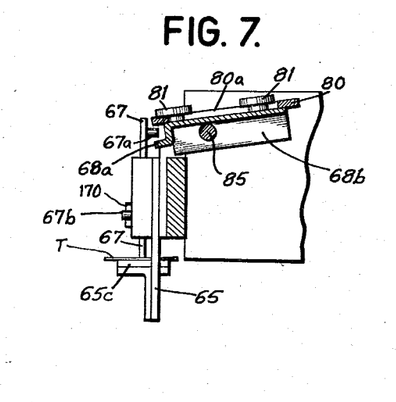
Fig. 7 is a sectional view through the punching means with the parts set for verifying.

To set the machine for verifying operation, hand knob 84 (Figs. 1 and 6) is turned until its index 84a points to the legend "Verify." In turning knob 84 to this position, the eccentric portion 83a of its shaft 83 coacts with studs 82 of pressure plate 80 to move the latter towards the right to the retracted position indicated in Fig. 7, in which the forward end of the pressure plate is removed from above the top of punch 67 and located directly above but at a distance from transverse pin 67a of the punch. In this retracted position of pressure plate 80, its hammer portion 80b is also withdrawn from above the head of the type 75 at printing position, so that printing will not be effected when the pressure plate is depressed.

Referring to Figs. 4, 7, and 8, punch 67, intermediate its length, has a forwardly projecting pin 67b passing through the forked end of a lever 170, pivoted on stud 171 to punch slide 65. The opposite end of lever 170 is connected by link 172 to one end of a bell crank 173, pivoted to the punch slide, and having its other end pivotally connected to a bar 174 having a horizontally elongated slot 174' through which the shanks of studs 175, fixed to the punch slide, pass to mount bar 174 for slidable movement lengthwise of the punch slide. The lower edge of bar 174 is formed with teeth 174a spaced correspondingly to the spacing of the index positions 0 to 9, X, and 12 of a card column. Between bar 174 and punch slide 65 is a light spring 176, yieldably forcing the bar towards the right. This spring force is transmitted by bar 174 to bell crank 173, link 172, and lever 170, tending to rock lever 170 clockwise. The forked end of lever 170 presses on pin 67b and thereby constantly tends to depress punch 67, but with the stripper plate 68 at its normal clockwise limit (Fig. 13), the engagement of lip 68a of the stripper plate with pin 67a prevents depression of the punch by lever 170.

Figure 12:
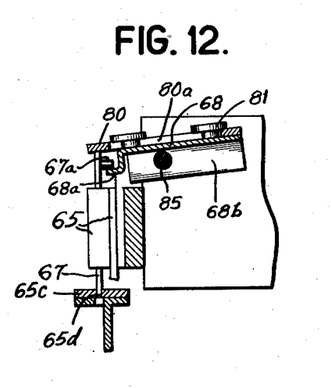
Fig. 12 is a view similar to Fig. 7 with the parts set for punching operation, and showing completion of the punching operation.

With a card column at operating position within card slot 65a, to verify the accuracy of the punching in the card column, the operator depresses a designation key corresponding to the designation 9 to 0, X, or 12, the perforation for which should be in the column if the latter was correctly punched. Depression of the designation key initiates a cycle of cam shaft 40, in the same manner previously described, during which cam 58 (Figs. 15, 16, 17, and 21) causes punch slide 65 to be shifted, along the column in operating position, to the key-selected position in which punch 67 is above the index position corresponding to the depressed key. Cam 71 (also see Fig. 4) then operates to cause alining and locking tooth 74a to enter the notch 70a of alining rack 70, fixed to slide 65, to lock the latter in the key-selected position. Cam 88 next effects reciprocation of link 86 to oscillate the punch-operating assembly. When the machine was set for punching, the pressure plate 80 of the punch-operating assembly was engaging the head of punch 67, as indicated in Figs. 12 and 13; hence downward movement of the punch-operating assembly caused pressure plate 80 to positively move the punch down through its complete down-stroke to perforate the card. During such operation, lever 170 merely followed pin 67b of punch 67 but had no influence on the punch. Now, with the machine set for verifying, pressure plate 80 has been retracted from above the head of punch 67 and downward movement of the punch-operating assembly causes the pressure plate to move idly downward to the position shown in Fig. 7, without affecting the punch. At the same time, stripper plate 68 is moving down, permitting the punch 67 to follow under the influence of spring-actuated lever 170. The punch is thus depressed under the influence of the lever 170 alone, as the punch-operating assembly 68—80 moves downwardly. As lip 68a of stripper plate 68 rocks downwardly, pin 67a of punch 67 and, therefore, the punch itself may move downwardly under the yieldable pressure of lever 170 on pin 67b of the punch. If the card column has been correctly punched with the designation corresponding to the operated designation key 12, the card will have a perforation under punch 67, permitting the punch to move freely through the perforation and into die hole 65d of punch die 65c. If the card column is incorrectly punched, it will not have a perforation but a blank, solid portion, below punch 67. Since the pressure of lever 170 on pin 67b of the punch results from light spring 176, this pressure is impositive, light, and yielding, causing the punch to be stopped by the unperforated portion of the card without penetrating the latter.

Before stripper plate 68 is rocked to lower its lip 68a and permit depression of the punch, a tooth 174a of bar 174 is opposite a pin 178 at the end of the horizontal arm of a bell crank 179, as indicated in Fig. 4. When the card column is accurately punched, lever 170 moves punch 67 through the correct perforation, to its lower limit. As punch 67 thus moves to its lower limit, lever 170 concomitantly rocks clockwise, permitting bar 174 to move under the influence spring 176, its full distance to the right; i. e., until stopped by engagement of the left end of its slot 174' with the shank of a stud 175. This movement of bar 174 is equal to that between successive teeth of the bar, again locating a tooth of the bar above pin 178. When the card column is incorrectly punched, punch 67 is stopped by an unperforated surface of the card, permitting spring 176 to move bar 174 only about half the distance between successive teeth of the bar, thereby locating a notch 174a of the bar substantially above pin 178 of lever 179.

The lower end of lever 179 is connected by a link 180 to one end of a bell crank lever 181 urged clockwise (Fig. 4) by a spring 182. The other end of lever 181 rides on the periphery of a disk 183 (see Figs. 4, 8, 9, 16, and 21) fast to cam shaft 40 and provided with a cam notch 183a. While lever 181 is riding on the circular portion of disk 183, spring 182 cannot rock lever 179 clockwise.

During the cycle of cam shaft 40, cam 88 rocks stripper plate 68 to lower its lip 68a to the position indicated in Fig. 7. This action of lip 68a permits punch 67 to move through a correctly punched hole in the card or to be stopped by the card surface if the punching is incorrect. In the case where the correct hole is punched in the card, the punch moves to its lower limit accompanied by shifting of slide bar 174 a full step to the right (Figs. 4 and 8) to locate a tooth thereof above pin 178. In the event the card column is inaccurately punched or is not punched in the intended index position, punch 67 is arrested by the surface of the card, accompanied by a half-step of movement of bar 174 to the right (Fig. 4) to locate a notch between a pair of teeth 174a above and substantially in position to receive pin 178. After the downward stroke of the punch-operating assembly has been completed and while this assembly is idling (see Fig. 21), the notch 183a of disk 183 comes under the follower end of lever 181. If the card column was correctly punched, the flat of a tooth 174a will be above pin 178, and although notch 183a is under the follower end of lever 183, spring 182 is able to move the lever clockwise only a slight extent before pin 178 abuts the tooth 174a above it. However, if the card column was incorrectly punched, an interdental notch of bar 174 will be above the center of pin 178. Spring 182 is then effective to rock lever 181 its full clockwise extent, as indicated in Fig. 8. During this action, lever 179 is rocked similarly and the left side of pin 178 encounters the corner of the tooth 174a, located to its left, and cams against the tooth corner to move bar 174 slightly to the left as it enters the interdental notch. As a result, bar 174 is locked, as shown in Fig. 8, after a slight return movement to the left. As an incident to this slight return of bar 174, lever 173 is rocked clockwise, and through link 172, rocks lever 170 slightly counterclockwise. Consequently, the forked end of lever 170 raises punch 67 slightly, to bring the lower cutting edge of the punch at a clearance distance from the surface of the card. The purpose of this is to prevent contact between the punch and the card during the release operation which accompanies determination of an incorrect punching, as will be explained, thereby avoiding any possibility of damaging or dulling the punch during the release of the card.

When the card was incorrectly punched, pin 178 of lever 179 moved fully into a notch between teeth 174a of bar 174, as explained above. Concomitantly with, and as a result of this, lever 181 rocks its full extent clockwise, as indicated in Fig. 8. As lever 181 moves to its clockwise limit, a projection 181a thereof (Figs. 4, 8, and 9) strikes arm 149b (Fig. 9) of escapement release lever 149 to rock the latter clockwise. Arm 149a of lever 149 thereupon moves under projection 132a (Fig. 14) of dog 132, camming the dog upwardly to release it from rack 112. As in the release key operation, pawl 135 remains disengaged from the rack. Due to its frictional mounting lever 149 remains in actuated clockwise position while lever 181 is returned as cam notch 183a passes the follower end of the latter lever. The notch 183a traverses and passes lever 181 while the dwell of cam 88 is engaging pin 87a of lever 87 which operates the punch-operating assembly (see Fig. 21). Hence, during the punching operation of the machine, the notch 183a will not move under lever 181 until the punch is fully depressed and has punched a hole. The bar 174 will accordingly have moved a full tooth distance to the right, preventing effective rocking of lever 179. The cam notch 183a will then pass lever 181 while the punch is fully depressed, so that lever 181 will have no tendency to effect release operation when the machine is set for punching.

During the verifying operation, and upon finding of an incorrect punching on a column, lever 149 was moved clockwise to release position, in which it remains after lever 181 is returned, as explained before. After the release operation starts, and after lever 181 has been returned, the escapement cam 138 acts (see Fig. 21). As a result, pawl 135 is momentarily lowered into engagement with rack 112, temporarily arresting release operation. The pawl 135 is soon lifted, and the release operation resumes to move the card to last column or eject position, from which the operator removes it and segregates it from the accurately punched and verified cards. When rack 112 moves to its last column position, pin 152 thereof strikes downwardly bent end 149' of lever 149, returning the latter to normal position. The dog 132, thereupon, also reengages rack teeth 112a.

In above manner, when a card column is found by the verifying operation of a key 12 to be incorrectly punched, the card is ejected or moved to its eject position.

If the verifying operation finds a correctly punched column, a tooth of bar 174a on punch slide 65 prevents effective clockwise action of lever 181, projection 181a does not operate release lever 149, and cam 138 subsequently causes member 134 to effect the regular column escapement of the card carriage, bringing the next card column to verifying position at card slot 65a of punch slide 65.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a machine operating on records on which designations may be recorded and which records are successively locatable at an operating station; the combination of recording/verifying means operable alternatively to record or verify the designations of a record at said station, means to select either verifying or recording operations to be performed by the recording/verifying means on the latter record, and designation-selecting means to select the designations to be verified or recorded by the recording/verifying means.

2. In a machine operating on records on which designations, in the form of perforations, may be recorded and which records are successively locatable at an operating station; the combination of perforating/verifying means operable alternatively to perforate or verify the designations of a record at the operating station, means to select either perforating or verifying operations to be performed by the perforating/verifying means on the latter record, and designation-selecting means to select the designations to be perforated or verified by the perforating/verifying means.

3. In a machine operating on records which may bear designations in the form of perforations; the combination of perforating means to perforate designations into the records, means to alternatively effect verifying of the designations of the records by said perforating means, and designation-selecting means to select the designations to be perforated or verified by the perforating means.

4. In a machine operating on records which may be perforated to represent designations; the combination of perforating means, means to operate the perforating means to perforate the records with designations, and means to alternatively operate the perforating means to verify the designations of the records.

5. In a machine operating on records which may be perforated to represent designations; the combination of perforating/verifying means, means to positively operate the perforating/verifying means to perforate the records with designations, and means alternatively effective to impositively operate the perforating/verifying means to verify the records for accuracy of perforations.

6. In a machine operating on records which may be perforated to represent designations; the combination of a punch, means to operate the punch to perforate a record with a designation, and means to alternatively operate the punch to verify the designation of a record.

7. In a machine operating on records which may be perforated to represent designations; the combination of punching means, means to operate the punching means for perforating the records with designations, means to alternatively operate the punching means to verify the records for designations, and means to select either of said operating means for effective operation of the punching means.

8. In a machine operating on records which may be perforated to represent designations; the combination of punching/verifying means operable alternatively to punch or verify designations of records while successively located at a single operating station, means to select either a verifying or perforating operation to be performed by the punching/verifying means, and means effective during a verifying operation and under control of the punching/verifying means for manifesting verification of the correct and incorrect designations.

9. In a machine for handling records which may have perforated designation fields; the combination of means to locate a record field at an operating station, means to verify a perforated record field at said station for accuracy of designation perforations, means operable, alternatively to the verifying means, to perforate designations into a blank record field at said station, and means for selecting either the verifying or the perforating means for operation.

10. In a machine for handling records which may have perforated designation fields; the combination of means adapted to receive only one record at a time means to verify a perforated record field of a record in said receiving means for designations, means to punch a blank record field of a record in said receiving means with designations, and a common set of designation keys manually operable to select the designations to be verified or punched.

11. In a machine for punching index positions of record columns with designations; the combination of a bar carrying punching means and mounted to move along a record column to punch different positions thereof, a set of designation-selecting keys, means controlled by operation of said keys for controlling said movement of the bar to select the index positions to be punched in accordance with the designation selected by the operated key, and means for successively correlating the record columns, one at a time, with the bar to be punched in succession by the punching means.

12. In a machine for punching index positions of record columns with designations; the combination of a bar carrying punching means and mounted to move along a record column to punch different positions thereof, a set of designation-selecting keys, means controlled by operation of the keys for governing movement of the bar along the column to select the index positions to be perforated in accordance with the designation selected by the operated key, and means to automatically follow each punching operation by a column-by-column feed step to successively locate the columns in punching position with respect to said bar.

13. In a machine for punching index positions of record columns with designations and printing interpretations of the designations in each column; the combination of a bar carrying punching and printing means and mounted to move along a record column in accordance with the designation to be punched and interpreted, a set of designation keys, means controlled by operation of a key to control the movement of the bar in accordance with the designation corresponding to the operated key, and means for automatically locating the columns one after another at said bar to be operated on by the punching and printing means.

14. In a machine for verifying index positions of record columns for accuracy of designations; the combination of a bar mounted to move along a record column and carrying verifying means, a set of designation keys, means controlled by operation of a key for causing the bar to move along a column to locate the verifying means for verifying the designation corresponding to the operated key, and means for automatically feeding the columns successively to the verifying means to be verified in succession.

15. In a machine for punching records with designations; the combination of punching means, designation-selecting means, a cyclical operating means, means controlled by operation of the designation-selecting means for causing the cyclical operating means to start a single cycle, means controlled by the selecting means and operated by the cyclical operating means during its cycle for selectively conditioning the punching means for punching the designation selected by the selecting means, and means operated by the operating means during its cycle for causing the punching means in accordance with the selective conditioning thereof to punch the record with the selected designation.

16. In a machine for punching columns of a record with designations; the combination of punching means, a set of designation keys, a cyclical operating means common to all said keys, means controlled by operation of any of said keys for initiating a single cycle of said operating means, means operated by the operating means during its cycle for causing the punching means to punch one column of the record with the designation selected by the operated key, and means operated by the operating means during its cycle, and after the punching operation, for feeding the next column of the record into punching position with respect to the punching means.

17. In a machine for punching records with designations; the combination of punching apparatus including means settable according to designations to be perforated, a set of designation keys, means controlled by operation of a designation key for moving the settable means directly from its previous designation setting to the designation setting corresponding to the newly operated key, and means for operating the punching apparatus to punch the record, according to the designation settings, with the designations selected by said keys.

18. In a machine of the class described; means to operate on record cards, a magazine supplied with a stack of such cards, a device having a feed cycle to feed one card at a time from the magazine to the operating means, an automatic power drive for effecting a cycle of operation of said device, and means controlled by the device itself for interrupting operation of the device by the power drive at the completion of the feed cycle.

19. In a machine of the class described; means to operate on record cards, a magazine supplied with a stack of such cards, a reciprocatable picker carriage having a forward stroke to feed one card at a time from the magazine, and an idle return stroke, power means for effecting reciprocation of the picker carriage, and means controlled by the picker carriage for causing operation of the carriage by the power means to stop at the end of the return stroke.

20. In a machine for operating on records which may be perforated to represent designations; the combination of means to alternatively perforate the records with designations or to verify such designations when already punched, means for effecting a continuous and complete ejection of a record from the first-named means, a manually operable element for causing operation of the ejecting means, and means for alternatively operating said ejecting means under control of the first-named means and in accordance with a verifying operation thereof.

21. In a machine for verifying index positions of record columns for accuracy of designations; the combination of verifying means mounted to move along a record column, a set of designation keys, means controlled by operation of a designation key for selecting the position of the verifying means along the record column for verifying the designation corresponding to the operated key, and operating means for the verifying means movable along with the verifying means to any selected position thereof.

22. In a machine for verifying a record for accuracy of designations represented by perforations in index positions of columns of the record; the combination of verifying means adapted to engage the surface of the record at an index position when there is no perforation in the latter and to move through the index position when the latter is perforated, yieldable means for effecting an impositive operation of the verifying means for either engaging the surface of the record or moving through a perforation in the record, a toothed member, a coacting element for moving either into a notch of the toothed member or abutting a tooth thereof, means determined by the movement of the element for effecting a manifestation of the verifying operation, and means for determining the position of the member in accordance with whether the verifying means has moved through a perforation in the card or been stopped by the surface of the card so as to selectively locate either a tooth or a notch of the toothed member in position for coacting with said element.

23. In a machine of the class described, means to operate on records, a magazine adapted to be supplied with a stack of records, a reciprocatable picker carriage having a forward stroke to feed one record from the magazine and having an idle return stroke, said carriage being provided with spaced, parallel, confronting racks, a gear positioned between said racks, means for meshing one of said racks with the gear to cause a forward stroke of the picker carriage to be effected by rotation of the gear, and means operable at the end of the forward stroke for demeshing the latter rack and meshing the other rack with said gear to cause the continued rotation of the latter to effect the idle return stroke of the picker carriage.

EDWARD J. VON PEIN.